Oct. 3, 1967  D. A. OLSEN ETAL  3,344,670
TIME/TEMPERATURE INTEGRATORS
Filed Dec. 31, 1964  2 Sheets-Sheet 1

INVENTOR
Douglas A. Olsen &
R. Jean Osteraas
BY
CECIL C. SCHMIDT
PATENT AGENT

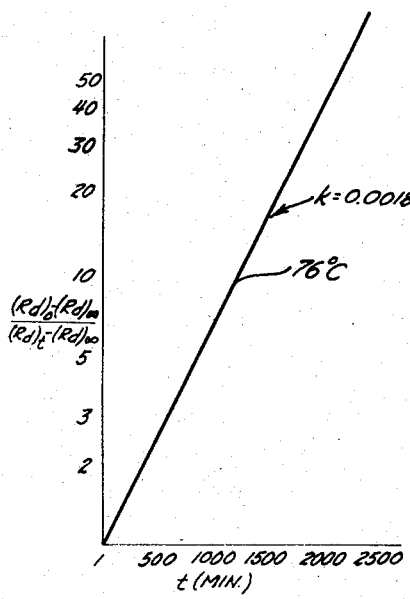
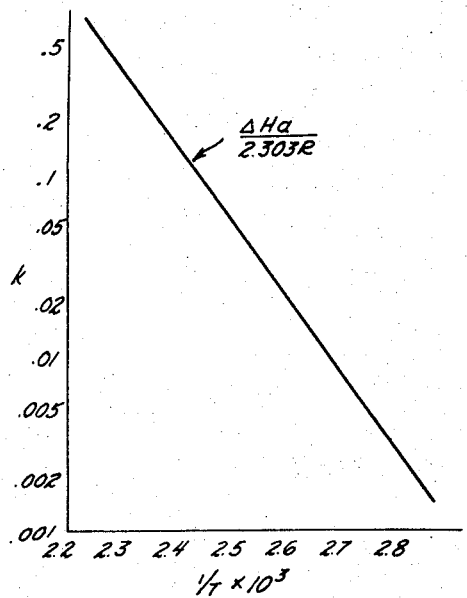
Fig. 6
Fig. 7
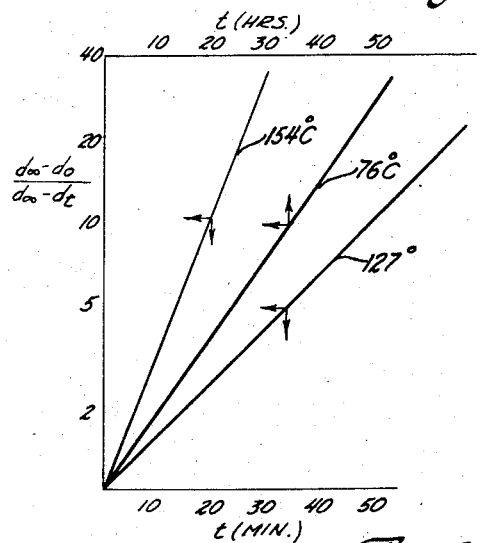
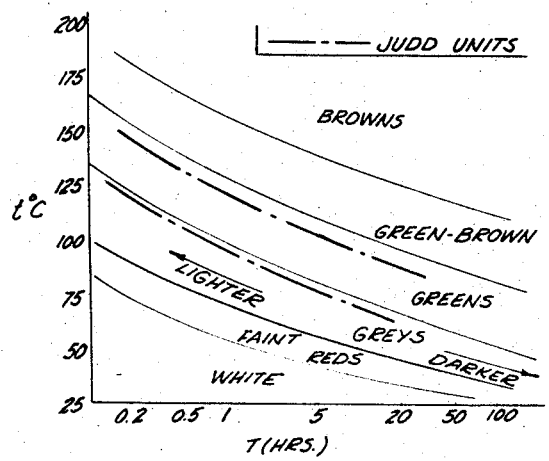
Fig. 8
Fig. 9
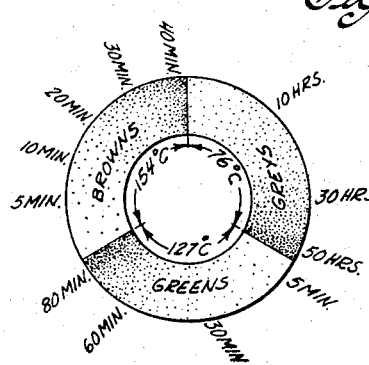
Fig. 10

United States Patent Office 3,344,670
Patented Oct. 3, 1967

3,344,670
TIME/TEMPERATURE INTEGRATORS
Douglas A. Olsen, Minneapolis, and A. Jean Osteraas, St. Paul, Minn., assignors to Ashland Oil & Refining Company, Ashland, Ky., a corporation of Kentucky
Filed Dec. 31, 1964, Ser. No. 422,834
9 Claims. (Cl. 73—356)

ABSTRACT OF THE DISCLOSURE

A time-temperature integrator consisting of a silver nitrate complex with bleached paper, the color of which is used as the measurement of the integral by comparison with a standard color chart.

---

The present invention relates to time/temperature integrators. In a second aspect, the present invention relates to a method for recording and visually indicating the integrated time/temperature history of a heat-sensitive product such as photographic film.

A cheap, reliable system for indicating the time/temperature history of various heat-sensitive products has been the subject of many investigations. Effective time/temperature integrators would be of particular value when used in conjunction with products having a useful life or other quality that is affected by the time/temperature history of the product. Typical examples of heat-sensitive products are photographic film, many fine chemicals, numerous pharmaceuticals, certain pre-packaged resin systems, frozen foods, aircraft tires, and the like. For example, as photographic film ages, its "speed" increases. A suitable time/temperature integrator, used in conjunction with the film, could be employed to predict the necessary changes in exposure settings that are needed to compensate for this increased speed. In a similar fashion, aircraft tires are known to deteriorate as a function of both time and temperature. Accordingly, a suitable time/temperatuer integrator could be used to indicate the point at which replacement of the tire was advisable. Unfortunately, however, many of the prior art time/temperature integrators suffer from deficiencies which include one or more of the following: bulk, complexity, cost, etc. By way of example, electrical recorders can be coupled with a thermocouple to give a time-temperature history. This type of indication, however, is both bulky and costly.

It has now been discovered, and this discovery forms a basis for the present invention, that cellulosic material (e.g., paper), when treated with silver nitrate, exhibits permanent color changes dependent only upon the thermal history of the treated paper. Apparently, the silver nitrate forms a heat-sensitive complex with the paper. By way of illustration, small patches of paper (e.g., chromatography paper), immersed in an aqueous solution of silver nitrate and then dried have been repeatedly demonstrated to be effective time/temperature integrators. Such a piece of paper (i.e., one properly treated) could be, for example, inserted into an aircraft tire prior to the time the tire is installed on an aircraft. At convenient intervals, the tire could then be removed and the color of the treated paper compared with a previously prepared color chart to thereby provide an indication of the time/temperature history of the tire. When the color of the indicator paper equaled or exceeded a preselected level, the operator would know that the tire should be replaced.

The present invention will be further understood by reference to the following description and examples when read in conjunction with the accompanying drawings, in which:

FIGURES 5 and 6 are graphs which show that the development of darkness follows first order chemical kinetics. The rate constants ($k$) are determined from the slopes;

FIGURE 7 is a graph which shows the applicability of the Arrhenius equation, thus demonstrating that the reaction proceeds by the same mechanism at all temperatures. The heat of activation ($\Delta Ha$) is determined from the slope;

FIGURE 8 is a graph which shows that the development of hues follows first order chemical kinetics;

FIGURE 9 is a graph which shows visually observed color bands indicating integrated time/temperature relationships; and FIGURE 10 shows, in plan view, a structure of this invention which is useful for determining the integrated time/temperature history of a heat-sensitive product.

Figure 1:
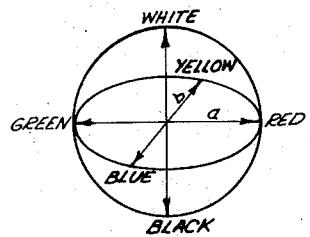
FIGURE 1 is a three-dimensional representation of chromaticity (hues) and darkness.

From the practical side, the preparation and use of the present time/temperature integrators is extremely simple. All that is required is that a cellulosic material, usually paper, be coated with a solution of silver nitrate and then dried. While not wishing to be held to any theory, we believe that a complex is formed between the silver nitrate and paper.

The most convenient way to coat paper is by immersing it into a solution of silver nitrate. However, other coating or impregnating methods can be used, e.g., spraying. Usually, the silver nitrate will be employed in the form of an aqueous solution, which is preferred. However, other polar solvents such as ethyl alcohol can be used, if desired. Ordinarily, the treating solution will contain from 10 to 60 parts by weight of silver nitrate per 100 parts by weight of water (or other solvent). These amounts are not critical, but are merely offered as practical guides and are based on past experience. Commonly, we prefer to use 25 to 45 parts of silver nitrate per 100 parts of water for the sake of convenience. However, more than 60 parts or less than 10 parts of silver nitrate can be used per 100 parts of water.

The time of contact between the solution and paper should be sufficient time to completely wet the surface of the paper. If desired, the paper can be completely saturated with the solution, giving due regard only to the wet strength of the paper. Then, the paper is dried in any convenient fashion.

We have found that the ultimate rate of color development (i.e., of the treated paper) can be increased or decreased by increasing or decreasing the amount of silver nitrate present in the treating solution. Thus, increasing the amount of silver nitrate in the treating solution apparently causes more complex to be formed and thereby increases the rate of color development as visually observed. Consequently, for high temperature applications (where the color development is rapid), only a small amount of silver nitrate is necessary. We are, of course, limited to temperatures below that where our substrate (e.g., paper) decomposes. For low temperature applications over a long period of time (e.g., frozen foods), more silver nitrate can be used to enhance color development. Color development has been observed for all concentrations of treating solutions ranging from 1–2 parts of silver nitrate per 100 parts of water (by weight) up to saturated aqueous solutions of silver nitrate. Concentrations below 5.9 molar are preferred, e.g., about 2.1 molar is particularly effective.

The treated paper (our time/temperature integrator) is then co-located with the heat-sensitive article whose time/temperature history is to be monitored. As time passes, the color of the treated paper will systematically and permanently change. These color changes can be followed by visually comparing the color of the treated paper with a previously prepared color chart which can be attached to our time/temperature integrator, as shown in FIGURE 10, or it can be kept separate. This comparison can then be used to determine speed adjustments for photographic film; to determine when aircraft tires should be replaced; etc. For example, tire replacement might be dictated when a particular green color has been obtained using our indicator.

The correlation between the color and film speed, etc., must be determined empirically. However, since the results obtained are repeatable, these initial empirical determinations can be used to prepare any number of time/temperature integrators and color charts. These empirical determinations are well within the skill of the routineer when aided by this disclosure. For many heat-sensitive products, useful life and other qualities have already been correlated with time and temperature. See, for example, the studies published in "Food Technology," beginning at volume XI, No. 1, 1957, entitled, "The Time Temperature Tolerance of Frozen Foods." Some of this data is shown in FIGURE 1 of U.S. Patent 3,082,624. To correlate the color of our time/temperature integrator with this or similar data, a piece of paper treated according to our invention need only be exposed to a selected temperature (preferably near the expected mean temperature for the product in question) for a period of time corresponding to the known useful life of the product at that temperature. The resulting color, at the point of expected deterioration, is then fixed. Color charts bearing this same color can then be prepared by known techniques. In operation, the color of one of our time/temperature integrators (co-located with the particular heat-sensitive product) is visually compared with the color chart. The colors will match at the point of expected deterioration. Variations in this procedure will be obvious to the routineer, e.g., the color used as a reference can be one corresponding to a time/temperature relationship safely within the useful life of the product. The operator using these devices need not concern himself with the underlying basis for why or how these devices work; he need only compare the colors and perform the required duties when certain colors match (i.e., the color of the integrator matches a preselected color on a color chart or wheel).

*Visually observed color changes*

As previously stated, we have observed that the changes in color of our time/temperature integrator are both permanent and systematic. That is, the colors follow a pattern from grey to green to brown. By way of illustration, Whatman #1 chromatography paper was immersed in an aqueous solution of silver nitrate (36 grams of silver nitrate per 100 ml. of water) and then allowed to air-dry. Two inch square samples of the impregnated paper were then placed in open Petri dishes and heated in an oven for varying periods of time at 76° C., 127° C., and 154° C. The colors that resulted from this exposure to heat are shown in Table I.

curate determinations and correlation of colors are best made with the aid of reliable instruments, rather than relying on the unaided human eye. In the following description and examples, a Gardner Automatic Color Difference Meter was used (Gardner Laboratory, Inc., Bethesda, Md.). Before discussing the present invention in greater detail, it is important to understand something about color theory. Such an understanding can be obtained by reference to the Color Difference Meter, itself. Numerous textual treatments of color theory are available and the following description is offered only as an aid to the reader.

The Automatic Color Difference Meter gives three numbers for each color, measured on any of its four scales. There are two "Color-Difference" scales: (1) the linear $R_d$ scale and (2) the exponential L scale; and two CIE (Commission Internationale d'Eclairage, International Commission on Illumination) scales: (3) the Chromaticity scale and (4) the Reflectance scale.

The $R_d$ scale's three values are: $R_d$ (45°, 0° reflectance), $a$ and $b$. $R_d$ is defined as 100 times the amount of light reflected by a sample divided by the amount of light reflected by a perfectly diffusing sample (actually magnesium oxide is used as the standard), when the light is incident upon the sample at an angle of 45° and the measuring device records the light diffused perpendicularly from the sample (0°). A completely absorbing specimen (i.e., black) would have an $R_d$ value of zero, and a perfect diffusing white would have a value of 100. $R_d$ is also equivalent to 100 Y.

$a$ and $b$ are defined in terms of tristumulus values, X, Y, and Z, as follows:

$$a = 175 f_y (1.02X - Y), \text{ and } b = 70 f_y (Y - .847Z)$$

If a sample has a zero value for both $a$ and $b$, it must lie on the black-white axis (see FIGURE 1), i.e., it must be some shade of grey. A plus value of $a$ indicates redness, and a minus value greenness. A plus value of $b$ indicates yellowness, and a minus value blueness. Thus, $a$ and $b$ are the rectangular coordinates of color (often termed chromaticity) in any plane intersecting the color sphere of FIGURE 1 perpendicularly to the black-white axis.

The quantity $f_y$ is the function $$.51 \frac{(21 + 20Y)}{(1 + 20Y)}$$

It may be seen that $f_y$ increases with decreasing values of Y. Its purpose is to retard an undesirable contraction in size of the $a$ and $b$ scales that otherwise occurs at Y (and therefore $R_d$) approaches zero.

Color difference is the resultant vector of three component differences:

(1) Lightness-index difference $\Delta_L$
(2) Chromaticity-index difference $\Delta a$
(3) Chromaticity-index difference $\Delta b$ The total magnitude of color difference E is a scalar quantity and may be computed from the equation:

$$E = \sqrt{(\Delta L)2 + (\Delta a)2 + (\Delta b)2}$$

This value E, expressed in terms of the N.B.S. or Judd

TABLE I.—VISUALLY OBSERVED COLOR CHANGES

| 76° C. | 127° C. | 154° C. |
|---|---|---|
| 17.5 hrs., Dark Grey<br>24 hrs., Dk. Grey Green<br>80 hrs., Dk. Green Grey | 5 min., Light Grey<br>15 min., Lt. Green<br>40 min., Dark Green<br>90 min., Green Brown | 5 min., Lt. Green<br>15 min., Brown Green<br>45 min., Dk. Brown Green<br>90 min., Dark Brown |

*Detailed determination, analysis and correlation of color changes*

For manufacturing purposes, (i.e., for preparing the color charts and our time/temperature integrators), accurate unit, gives no indication of the character of the color difference, since it does not indicate the relative quantity and direction of lightness, hue and saturation differences. Consequently, for time/temperature integrating purposes, color difference is most conveniently expressed in terms of $R_d$, $a$ and $b$ values.

The three values of the L scale are L, $a_L$ and $b_L$. The numerical spacing of the L scale, relative to $R_d$ or reflectance, is such that an object which appears to the eye as, roughly, halfway between black and white, will have a value of 50; an object one-quarter of the way from black to white—a value of about 25, etc. The physical relationship between $R_d$ and L is expressed in the following formula:

$$L = 10\sqrt{R_d} = 100\sqrt{Y}$$

Because of different circuit arrangements for $R_d$ and L, the $a$ and $b$ values arrived at in the two scales are different:

$$a_L = \frac{175(1.02X - Y)}{\sqrt{Y}} \text{ and } b_L = \frac{70(Y - .847Z)}{\sqrt{Y}}$$

(Compare with formulas above for $a$ and $b$.)

In the reflectance scale, X is defined as the ratio R of the light diffused from the sample to that which would be obtained from a perfect diffuser, when multiplied wavelength by wavelength by the $\bar{x}$ curve of the standard observer and by illuminant C:

$$X = \int_0^\infty \frac{\bar{x}\lambda C\lambda R\lambda d\lambda}{\bar{y}\lambda C\lambda d\lambda}$$

similarly for Y and Z. (Further explanation of these equations may be found in any good textbook on color theory.) Possible values of Y range from zero to one, X from 0 to 0.98, and Z from 0 to 1.18. Y is numerically equal to $R_d/100$, a convenient base for the two systems.

The chromaticity scale is a simple mathematical manipulation of X, Y and Z:

$$x = \frac{X}{X+Y+Z}, \quad Y = \frac{Y}{X+Y+Z}, \text{ and } z = \frac{Z}{X+Y+Z}$$

A complete colorimetric specification in this system is given by Y, x, y (z is unnecessary, since $x+y+z=1$).

In operation, the Color Difference Meter compares an unknown specimen with standards of predetermined color characteristics. In order to measure most accurately the color of any specimen according to the equations given, it is necessary to have a standard of similar spectrophotometric curve and color which has been accurately calibrated. An accurate calibration may be obtained from a spectrophotometric curve by first computing the tristimulus values X, Y, and Z, and then deriving the color by means of the equations given above.

A white standard is supplied with each instrument. Color standards may be obtained from the following sources:

(1) Gardner Laboratory, Inc., Bethesda, Md. Gardner Color Standards. Sets of from one to fifteen porcelain-enamel color standards. For color specifications see their Bulletin No. 115.

(2) National Bureau of Standards, Washington 25, D.C. Ten Standard Colors for Kitchen and Bathroom Accessories. A set of ten porcelain panels which have been visually matched for color against their respective master standard plaques and may differ from them by approximately one N.B.S. unit of color difference. The color specifications for the master standard plaques are available upon request.

(3) Munsell Color Company, 10 E. Franklin St., Baltimore 2, Md. The Munsell Color Standards. These standards are of painted paper and, therefore, somewhat fragile. There are 472 different Munsell colors which have been calibrated at the National Bureau of Standards and values of X, Y, and Z (with CIE Illuminant C) are available.

(4) The Container Corporation of America, 1301 W. 35th St., Chicago, Ill. Color Harmony Manual. This company supplies color chips approximately one inch square which have been calibrated.

To further illustrate and explain the present invention, a number of additional time/temperature integrators were prepared by immersing small square pieces of Whatman #1 chromatography paper (about 2″ x 2″) in an aqueous solution of silver nitrate (36 grams of silver nitrate per 100 ml. of water). When the pieces of paper had been saturated with the solution, they were removed and air-dried. These treated pieces of paper were then heated at various temperatures for various times to accelerate color development. The resulting color changes were measured using the Gardner Color Difference Meter previously described and using a green standard for 45°, 0° color and reflectance #CLG0009—3/8/60 FEK (obtained from Gardner Labs). This standard had the following values: $R_d$ equal to plus 49.8; $a$ equal to minus 16.5; and $b$ equal to plus 6.0. The results obtained are best understood by reference to the color sphere shown in FIGURE 1.

Figure 2:
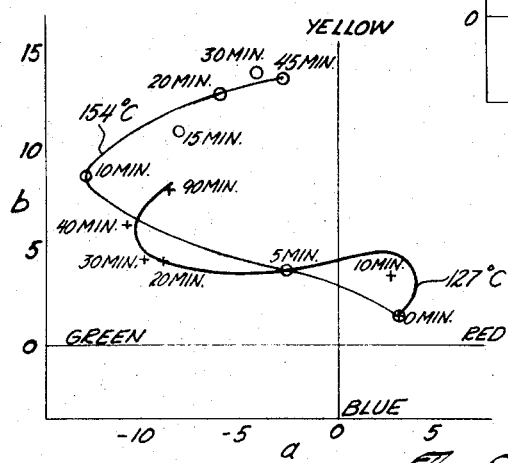
FIGURES 2 and 3 are graphs which show the development of hues (i.e., the color development along the equatorial plane of FIGURE 1)
Figure 3:
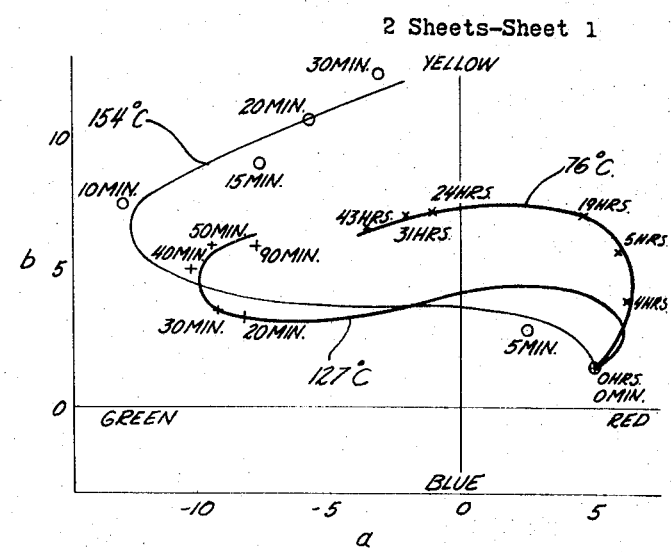

The data for the development of hues (i.e., the equatorial plane of FIGURE 1) is obtained in terms of $a$ and $b$ values as shown in FIGURES 2 and 3. These figures (2 and 3) are in agreement with the visually obtained data of Table I, viz., a red color should develop first (it does), followed by greens and then browns. While the data in FIGURES 2 and 3 do not follow the same exact paths, the actual color difference is not as great as it seems. This is true because the figures do not reflect the development of darkness, because of the sensitivity of the machine, because of experimental error, because only a small portion of the $a$ and $b$ scales are shown, and the like. To the naked eye, the differences are insignificant.

Figure 4:
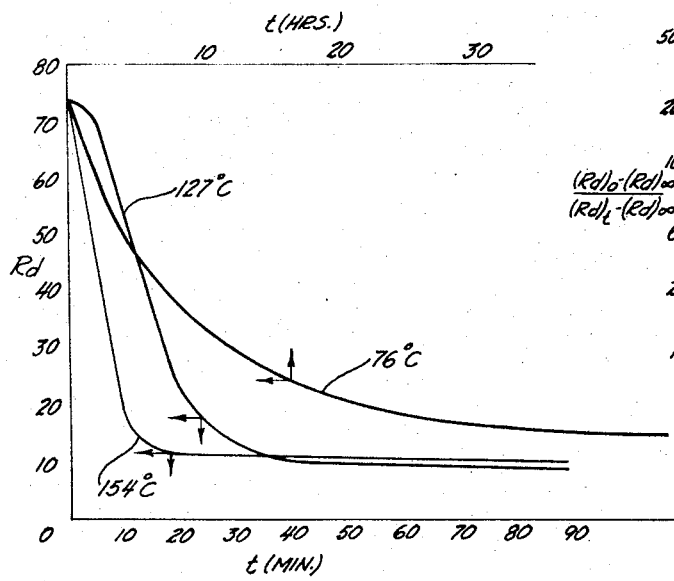
FIGURE 4 is a graph which shows the development of darkness (i.e., the color development perpendicular to the equatorial plane of FIGURE 1)

The development of darkness is perpendicular to the equatorial plane of FIGURE 1. The data on darkness is obtained in terms of $R_d$ values as shown in FIGURE 4. From an inspection of FIGURES 2, 3, and 4, it appears that the greys are most pronounced when the paths (shown in FIGURES 2 and 3) cross the yellow-blue axis, i.e., the blues are fairly neutral so only the grey is apparent.

The data of FIGURE 4 can be shown to obey first order chemical kinetics. For first order kinetics:

(1)
$$\frac{d \text{ (Products)}}{dt} = k(A)$$

where A is the concentration of the reactant, in the present case it is hypothecated to be a silver nitrate/cellulose complex, although we do not wish to be bound by this theory. Equation 1 can be restated in an alternate form:

(2)
$$\frac{dx}{dt} = k(a - x)$$

where $a$ is the initial concentration of A and $x$ is the concentration of product at any time $t$. Equation 2 can then be integrated to give:

(3)
$$\ln\frac{a}{a - x} = kt$$

Assuming there is a linear relation between $R_d$ values and concentration, the following substitution may be made:

(4)
$$\frac{a}{a - x} = \frac{(R_d)_o - (R_d)_\infty}{(R_d)_t - (R_d)_\infty}$$

where the subscripts $o$, $\infty$, and $t$ refer to initial values, final values and values at any time $t$, respectively. Substituting Equation 4 into Equation 3:

(5)
$$\log \frac{(R_d)_o - (R_d)_\infty}{(R_d)_t - (R_d)_\infty} = \frac{k}{2.303} t$$

Figure 5:
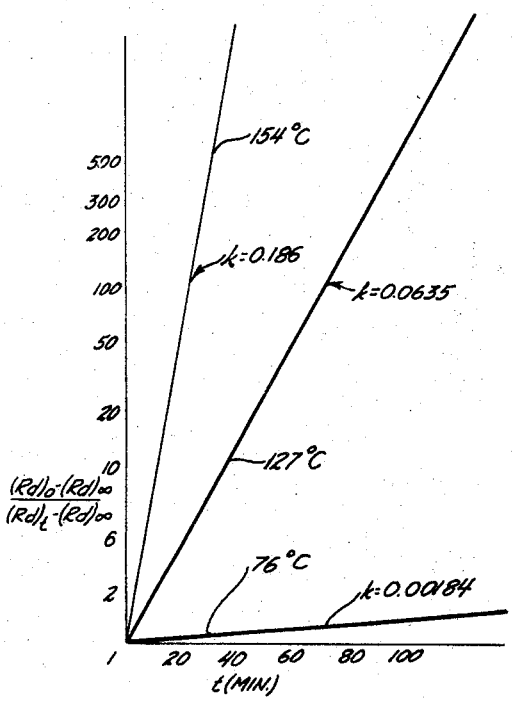

Thus, a graph of log $$\frac{(R_d)_o - (R_d)_\infty}{(R_d)_t - (R_d)_\infty}$$

versus $t$ should give a straight line with a slope of $k/2.303$. This is shown to be experimentally true in FIGURES 5 and 6. The slopes obtained from FIGURES 5 and 6 can be used to determine the heat of activation, $\Delta Ha$, viz.

$$(6) \qquad \frac{d \ln k}{dt} = \frac{\Delta HA}{R}$$

Integration gives:

$$(7) \qquad \log k = \frac{-\Delta Ha}{2.303 R} \cdot \frac{1}{T}$$

Thus, a plot of log $k$ versus $1/T$ should give a straight line of slope $-\Delta Ha/2.303R$. This is shown to be true in FIGURE 7. The activation energy, $\Delta Ha$, is 18,500 cal./mole.

For the circuituous path taken in the development of hues, it has also been possible to show that first order chemical kinetics apply. In this case the path length $d$, from the initial point in FIGURES 2 and 3, can be measured and substituted into an equation analogous to Equation 5:

$$(8) \qquad \log \frac{d_\infty - d_o}{d_\infty - d_t} = \frac{k}{2.303} t$$

where the subscripts have the same meaning as above. The results of substituting lengths into Equation 8 are shown in FIGURE 8 where straight lines result. Thus, the development of hues appears to be consistent with the first order kinetics previously developed.

The purpose of the foregoing discussion has been to show that the color changes follow a definite pattern and form the basis for a better understanding of the phenomena involved. A simplified mechanism with a slow second step is consistent with first order kinetics, viz.:

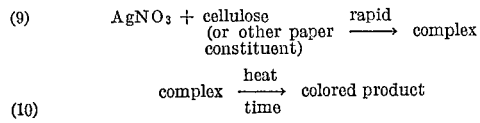

From visual observation of a series of treated paper patches heated at 76° C., 127° C., and 154° C. (the controls were heated at 25° C.), FIGURE 9 was constructed. This graph consists of series of bands of differing colors illustrating integrated time/temperature relations. The extent of reaction indicated by the center of, for example, the green band would be the same for either 55 hours at 76° C. or 30 minutes at 127° C. As a check on the color bands of FIGURE 9 (which bands are based on visual observations only), the Judd units were calculated for several points. As seen in FIGURE 9, the results are in good agreement with visual estimates. The Judd and kinetic data do not indicate boundaries between bands; they are intended only to verify the slopes obtained from visual observations. The position of a sample in a color band is determined by the amount of, say, green as compared to grey green or brown green. For longer exposures to heat, the green and grey bands darken in tone. However, the position is determined as above.

*Effect of temperature variations*

To determine the effect of temperature on a sample exposed to more than one temperature, several samples were exposed as shown in Table II. The samples were then visually matched to previously heated color patches (i.e., matched to known standards) by an impartial observer. Selected results shown in Table II illustrate how reliable these comparisons can be.

Identically prepared samples were also run for 24 hours at 76° C., followed by 30 minutes at 127° C., and vice versa. The colors developed were the same. Tests using other temperature combinations also showed that the final color is substantially independent of the path. Further attempts were made to see if paper immersed in aqueous silver nitrate would also change colors (while immersed) upon the application of heat. No color change was observed. To obtain any discernible color development, the paper had to be removed from the treating solution and dried.

*Effect of substrate on color development*

Using different cellulosic materials, we found that the color resulting from a given exposure to heat could be varied depending on the type of cellulosic material selected, i.e., the rate of color formation can be speeded up or slowed down by using different cellulosic materials. Bleached paper gives a slower color development than unbleached paper. Using a standard aqueous solution of silver nitrate and a standard treating procedure, we found that treated wood turned black quite rapidly. Also, different papers reacted differently. For example, the following papers were treated identically and heated for 20 minutes at 265° F.:

(a) Whatman #1 chromatography and electrophoresis paper
(b) Nibroc
(c) Kim Wipes
(d) Kleenex
(e) S & S filter paper, #589 white ribbon ashless
(f) S & S filter paper, #589 blue ribbon ashless
(g) S & S filter paper, #589 black ribbon ashless
(h) S & S filter paper, #602
(i) S & S filter paper, # 576
(j) S & S filter paper, #410
(k) S & S filter paper, #604
(l) S & S filter paper, #597

All of these developed a green color. Nibroc developed the darkest green and, in fact, actually began to turn green at room temperature. Brown kraft paper (in a determination separate from the above series) also developed a dark green color quite rapidly. The results obtained with Nibroc and kraft papers and the results obtained with wood suggest that certain constituents present in unbleached paper, other than cellulose, may hasten the development of color. The most obvious possibility is lignin.

*Effect of treating solution on color development*

To illustrate the effect of the concentration of silver nitrate in the treating solution on the resulting color development, the following data are presented. These data were obtained using the same paper, the same treating technique, and a heat treatment of 30 minutes at 105° C. Only the concentration of silver nitrate in the treating solution was changed.

TABLE III

| Run | Molarity of Aqueous Silver Nitrate | Color |
| --- | --- | --- |
| 1 | 0.06 | Off white. |
| 2 | 0.3 | Faint yellow-red. |
| 3 | 1.5 | Yellow-red. |
| Previous work | 2.1 | Grey. |
| 4 | 2.95 | Grey green. |

TABLE II

| Sample | Impartial Observer | From Figure 9 |
| --- | --- | --- |
| 24 hrs. at 76° C. and 30 min. at 127° C. | 80 hrs. at 76° C. | 70 hrs. at 76° C. |
| 30 min. at 127° C. and 24 hrs. at 76° C | 60 hrs. at 76° C. | 70 hrs. at 76° C. |
| 24 hrs. at 76° C. and 5 min. at 154° C. | 80 hrs. at 76° C. | 75 hrs. at 76° C. |
| 20 min. at 127° C. and 10 min. at 154° C. | 90 min. at 127° C. | 80 min. at 127° C. |

Thus, the rate of color development is related to the concentration of silver nitrate in the treating solution. Consequently, more silver nitrate can be used to hasten color development in low temperature applications and less silver nitrate can be used to retard color development.

*Illustrative use of these concepts*

By way of example, published data teaches us that fried chicken will deteriorate to a specific quantity level when held at 10° F. for one month. Using a concentrated aqueous solution of silver nitrate (e.g., about 5.9 molar) and an unbleached paper (to accelerate color development), a time/temperature integrator is prepared. It is then held at 10° F. for one month. The resulting color at the point of deterioration is then fixed. A matching color chart is then prepared by known techniques. An example of such a chart is illustrated in FIGURE 10; this chart can be attached to the time temperature integrator, or it can be kept separate. Next, a new time/temperature integrator is prepared in the identical fashion. It is then co-located with fried chicken. All that an operator (e.g., a cook) need do is to compare the color of the integrator (co-located with the chicken) with the color chart given him. His task is simple—use the chicken if the color has not reached the point of matching with the color chart, or discard the chicken if the color matches or exceeds the predetermined color on the color chart.

Thus, it can be appreciated that the present invention involves novel innovations in the area of time/temperature integrators. By employing the method and device specified in this disclosure, it is possible to prepare simple time/temperature integrators which can be economically and simply used to determine the time/temperature history of a product. These devices weigh a fraction of an ounce, have no moving parts, need no external wiring or power supply and, while the underlying theory may be complex, practical application does not require any special calculations.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples, nor by the specific proportions which have been given for the sake of illustration, nor to the underlying theory which has been offered by way of explanation, but it is intended to claim all novelty inherent in the invention, as well as all modifications and variations coming within the spirit and scope of the invention.

What is claimed is:

1. A method for determining a quality related to the time/temperature history of a heat-sensitive product which comprises:
    (a) co-locating treated paper with said heat-sensitive product;
    (b) exposing said treated paper to the same time/temperature history as said heat-sensitive product, said treated paper having been prepared by impregnating paper with a solution of silver nitrate and thereafter drying said paper to thereby form said treated paper; and
    (c) selectively determining the quality of said heat-sensitive product by comparing the color of said co-located paper with a predetermined color standard.

2. The method of claim 1 wherein said paper is a bleached paper and wherein said solution of silver nitrate is an aqueous solution of silver nitrate.

3. The method of claim 1 wherein said heat-sensitive product is photographic film.

4. The method of claim 1 wherein said heat-sensitive product is a food.

5. A method for indicating the time/temperature history of an article which comprises co-locating an integrator with said article, said integrator comprising a complex of silver nitrate, exposing said complex to the same time/temperature environment as said article, and thereafter selectively determining the intervening time/temperature history of said article by visual reference to the color of said integrator, said complex having an activation energy of about 18,500 cal/mole and exhibiting systematic color changes as a function of time and temperature.

6. As an article of manufacture, a time/temperature integrator comprising in combination a supporting means, a complex of silver nitrate located on a central portion of said supporting means, and a color chart of fixed characteristics, said complex exhibiting systematic color changes as a function of time and temperature, said color chart characteristics being related to the systematic color changes occurring in said complex with an increase in the time/temperature integral, and said color chart having printed information correlated therewith whereby the color of said complex can be selectively matched with a color of said color chart to thereby obtain the printed information correlated therewith.

7. The article of claim 6 wherein said supporting means is bleached paper and wherein said complex is the complex between silver nitrate and bleached paper.

8. As an article of manufacture, a wafer-like time/temperature integrator comprising:
    (a) supporting means;
    (b) a complex of silver nitrate located on a central portion of said supporting means, said complex exhibiting systematic color changes as a function of time and temperature; and,
    (c) a color wheel of fixed characteristics surrounding said central portion and supported by said supporting means, said characteristics being related to the systematic color changes occurring in said complex with an increase in the time/temperature integral.

9. The article of claim 8 wherein said supporting means is paper and wherein said complex is a complex of paper and silver nitrate.

References Cited

UNITED STATES PATENTS

| | | | |
|---|---|---|---|
| 2,552,477 | 5/1951 | Cole | 73—356 X |
| 2,757,292 | 7/1956 | Schulman et al. | 252—408 X |
| 3,207,614 | 9/1965 | Canevari | 252—408 X |

FOREIGN PATENTS

| | | |
|---|---|---|
| 2,432 | 1/1910 | Great Britain. |

LOUIS R. PRINCE, *Primary Examiner.*

F. SHOON, *Assistant Examiner.*